United States Patent [19] [11] 3,881,958
Carr et al. [45] May 6, 1975

[54] MASS FLOW RATE CONTROL OF CHLORINE CONTENT OF ELECTROLYTE FOR HIGH ENERGY DENSITY BATTERY

[75] Inventors: Peter Carr, Utica; Carmelo J. Amato, Livonia, both of Mich.

[73] Assignee: Energy Development Associates, Madison Heights, Mich.

[22] Filed: July 2, 1973

[21] Appl. No.: 376,019

[52] U.S. Cl. .............................. 136/86 B; 136/86 R
[51] Int. Cl. .......................................... H01m 27/12
[58] Field of Search .............. 136/86 B, 86 C, 86 R; 73/194 M

[56] References Cited
UNITED STATES PATENTS
3,542,597  11/1970  Smith et al. ..................... 136/86 B
3,716,416   2/1973  Adlhart ........................... 136/86 B Primary Examiner—John H. Mack
Assistant Examiner—H. A. Feeley
Attorney, Agent, or Firm—B. F. Claeboe; B. E. Hosmer

[57] ABSTRACT

A high energy density battery system of the metal-chlorine electrode type, in which chlorine dissolved in or dissolved and entrained in aqueous metal chloride electrolyte is utilized as a feed to an electrode compartment, includes a conduit for withdrawing of electrolyte from the electrode compartment means for adding chlorine to the electrolyte circulating through said conduit and a return conduit, a pump to maintain the electrolyte in circulation, a sensor to measure chlorine: electrolyte ratio in a conduit by measuring the mass flow rate of material being pumped compared to said mass flow rate when a desired ratio of chlorine to aqueous electrolyte is pumped, means for controlling the addition of chlorine to the circulating electrolyte in response to the sensed mass flow rate and conduit means for returning the rejuvenated electrolyte to the electrode compartment. Sensores utilized are responsive to the mass flow rate and can distinguish between flows which are high or low in chlorine content, the former being of lower mass flow rates. The sensors may be connected to means for charging chlorine to the circulating electrolyte and thereby can automatically control the chlorine content of the electrolyte, maintaining it at about a desirable level.

11 Claims, 4 Drawing Figures

MASS FLOW RATE CONTROL OF CHLORINE CONTENT OF ELECTROLYTE FOR HIGH ENERGY DENSITY BATTERY

BACKGROUND OF THE INVENTION

High energy density batteries have recently been of much interest, especially because of their non-polluting characteristics and their suitability for employment in powering motor vehicles and in other applications such as peak power. Among suitable high energy density batteries for such application are those based on "chlorine electrodes" and metal electrodes. The operations of such batteries depend on feeding chlorine, usually in dissolved or dissolved and entrained form in an aqueous metal halide electrolyte, through porous or perforated graphite or carbon electrodes, creating an electric potential difference and causing current flow due to the chlorine being ionized and the metal of the other electrode being converted to dissolved ionic form. To avoid dead spots in various cells and on the electrodes the electrolyte is continuously circulated through an electrode compartment having a stack of metal-chlorine electrodes and depleted electrolyte, lower in chlorine content than desired, is recharged with chlorine and is returned to the electrode compartment. Of course, it is desirable that the chlorine concentration in the electrolyte returning to the electrode compartment should be maintained at a most effective level, for best operation of the battery system and various devices have been used to control this.

In a practical method that has been employed, samples of the electrolyte are taken periodically during operation of the system and when chlorine decreases to below a desired level, valves are actuated and adjustments are made in an attempt to reach an equilibrium. However, this is a crude method of control and still requires the employment of a technician to make the periodic tests and adjustments. Other methods utilize complex electronic detection and signalling equipment, including gas chromatographic apparatuses, spectrophotometers, automatic chemical testing apparatuses, etc., many of which are very costly and require expert supervision and maintenance. Accordingly, there has been a need for the invention and development of simple, trouble-free control of the chlorine addition to rejuvenate the electrolyte of metal-chlorine electric energy storage devices. The present invention provides an acceptable simple solution to such problem.

SUMMARY OF THE INVENTION

In accordance with the present invention, a high energy density battery system comprises an electric energy storage device of the metal-chlorine electrode type, conduit means through which chlorine gas dissolved in or dissolved and entrained in aqueous metal chloride electrolyte is fed to the electrode compartment having the metal and chlorine electrodes therein and thence to electrodes of a plurality of cells in the electrode compartment, said cells being so connected that the chlorine electrodes thereof are connected with the positive terminal of the battery, conduit means for conveying away from the electrode compartment electrolyte containing no dissolved chlorine or containing dissolved chlorine or a mixture of dissolved and entrained chlorine at a lower level than in the electrolyte entering the cell, pumping means, a sensor to measure chlorine:electrolyte ratio in a conduit, by measuring the mass flow rate of material being pumped compared to said mass flow rate when a desired ratio of chlorine to aqueous electrolyte is pumped and means for controlling the addition of chlorine to the circulating electrolyte in response to the sensed mass flow rate. In the process aspect thereof the improved method comprises pumping the electrolyte chlorine mixture through the system, sensing the chlorine : electrolyte ratio by measuring the mass flow rate of material being pumped compared to said mass flow rate when a desired ratio of chlorine to aqueous electrolyte is pumped and controlling the addition of chlorine to the circulating electrolyte in response to the sensed mass flow rate.

DESCRIPTION OF PREFERRED EMBODIMENTS

The present invention and its mode of operation will be apparent from the following description, taken in conjunction with the accompanying drawing in which.

Figure 1:
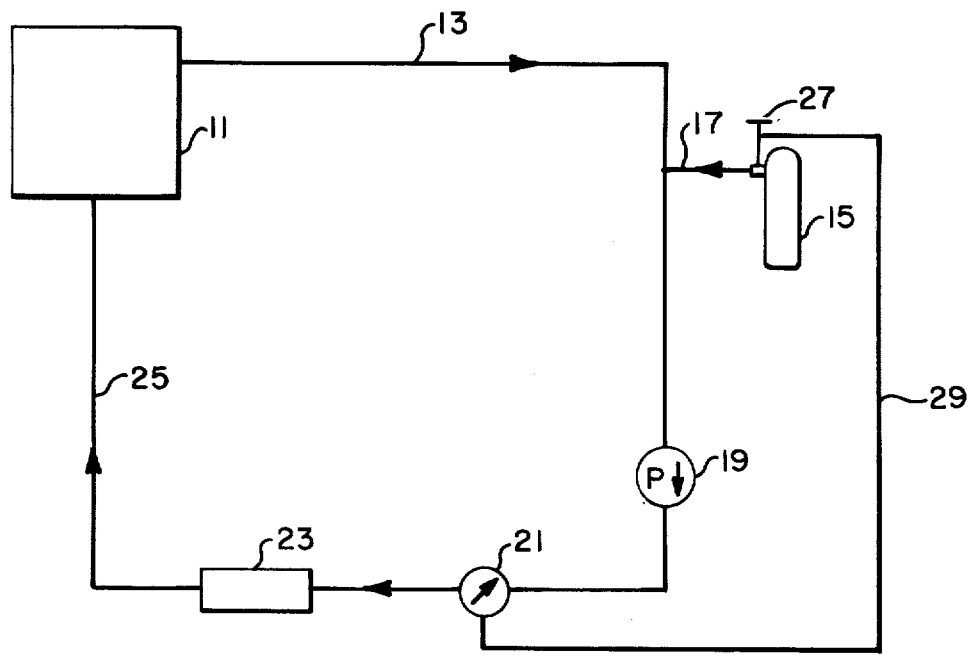
FIG. 1 is a schematic plan view of a metal-chlorine electric energy storage device including an electrode compartment for controllably rejuvenating the electrolyte by the addition of chlorine thereto.

In FIG. 1, electrode compartment 11, which includes conventional stacks of "cells", each of which contains a chlorine and metal electrode, i.e., zinc plate, with surrounding aqueous metal chloride electrolyte (the battery interior not being shown because of its conventional nature; see U.S. Pat. No. 3,713,888) is connected through outlet conduit 13 to chlorine source 15, chlorine addition conduit 17, pump 19, sensor 21, dissolver 23 and feed conduit 25, through which the rejuvenated electrolyte is returned to the electrode compartment. During operation of the battery system, pump 19 maintains a flow of electrolyte in a clockwise direction so as to provide a sufficient supply of chlorine "fuel" for the electrode compartment and to create a circulation in the cells of the electrode compartment to prevent "hot spots," uneven attacks on the metal electrode and depositions of residues or films at stagnant locations in the cell which can interfere with the development of maximum electrical discharge capability.

The electrolyte leaving electrode compartment 11 and entering exit conduit 13 on its recycling path is lower in chlorine content than is desirable in the electrode compartment because chlorine has been consumed during discharge. In some cases, there will be little dissolved chlorine and no entrained chlorine in the electrolyte being passed through conduit 13 and in other cases some entrained chlorine will be present with dissolved chlorine, but not as much as is desirably added to the electrode compartment through conduit 25. In either situation, the electrolyte has to be rejuvenated or ultimately it will contain no entrained or dissolved chlorine for discharging by reaction with the metal electrode in the cells. Accordingly, a source of chlorine, such as pressure vessel or tank 15 or a supply obtainable from a store of chlorine hydrate from which chlorine is releasable by heating or contacting with water at a temperature elevated above the decomposition temperature of the chlorine hydrate, is communicated through conduit 17 with conduit 13 or an extension thereof so that chlorine may be added to the electrolyte as desired. Tank 15, as illustrated, is under a pressure greater than that in the recycle conduits 13 and 25, and therefore, when discharge valve 27 is opened, chlorine is forced into the recylcle line and is drawn into the inlet of pump 19, together with electrolyte. Various types of pumps may be employed, including those of constant speeds or powers, but it is preferred to utilize positive displacement pumps running at constant speeds. In any event, whether using these, such as reciprocating, gear, peristaltic, eccentric rotor or worm pumps, or centrigual pumps or pumps of other designs, care will be taken so that gas or vapor locking of the pumps will be avoided. In pump 19, the chlorine and the aqueous metal chloride electrolyte will be intimately mixed and dissolving of much of the chlorine will be promoted by the vigorous action of the pump and by the creation of turbulences in the inlet to and discharge from the pump. Then, when some entrained and undissolved chlorine still in the electrolyte it will pass through sensing device 21, which is adapted to measure the mass flow rate or give an indication of the mass flow rate of the stream passing through it. The mass flow rate may be measured by the deflection of a pointer or flow-moved metal or plastic obstruction in the flow path, which obstruction or indicator will be moved more if the mass rate of flow is greater, which will be the case when a fluid flowing is essentially gas free. Alternatively, other forms of mass flow rate sensitive devices may be employed, including gas detectors, conductivity measuring devices, wave transmission detectors, weighing devices, etc. For the purpose of this invention, the deflecting needle which is moved more by greater mass flow rates will be utilized as exemplary but it is understood that equivalents thereof may also be used.

When pump 19 is a constant speed pump the deflection of an indicating needle of sensor 21 will be lessened when an excess chlorine gas is present in the electrolyte. Thus, the desirable operating conditions of the system can be established and when the mass flow rate is greater than desired, valve 27 will be opened or opened to a greater extent and additional chlorine will be caused to flow into the system, causing a reduction in the mass flow rate to the point at which the desired ratio of gaseous chlorine to electrolyte is obtained. When the chlorine concentration is too high in the recycle line, sensor 21 will indicate this and valve 27 will be shut or closed down somewhat to allow lowering of the gaseous chlorine content of the electrolyte as chlorine is consumed in electrode compartment 11. The controls employed may be off-on variable within a range, with the latter being preferred because it allows the attainment of a more stable equilibrium condition. Nevertheless, the off-on operation is also feasible and both types can be used even when the discharge from the battery system is irregular.

For automatic control of the addition of chlorine to the recycle line to maintain a desired content thereof in the electrolyte an electronic control, not illustrated, may be provided or mechanical means may be utilized to open or close valve 27 or other equivalent valve means in response to mass flow rate changes indicated by sensor 21. Means for operating the valve, either in on-off or variable manner over a range, are known and so are not indicated here except by a showing of an electrical line 29 between the sensor and the valve controlling addition of chlorine to the system. Instead of electronic or electrical means, fluid pressure or mechanical means may be employed to actuate the valve 27. When the chlorine is released from its hydrate, the sensor means 21 may control heating of the hydrate or addition of water or electrolyte to it to release chlorine, while it also controls valve 27. From the electrode compartment the electrolyte could flow through the hydrate storage compartment 15. Various check valves may be included in the system to prevent reverse flows but usually these will not be necessary. Chlorine dissolver or absorber 23 may contain a plurality of finely divided orifices or passageways to promote further solution of entrained chlorine or to make the entrained bubbles of chlorine finer before the electrolyte enters the electrode compartment. Although dissolvers may be employed, the present system operates well without the use of a dissolver, apparently at least partly due to the mixing action effected in the pump. If desired, means may be provided in line 17 or where it meets the main recycle line to finely divide the chlorine there and additionally promote solution and dispersion thereof.

It is preferable that pump 19 be of the constant speed type so that the mass flow rate sensor 21 will be moved or actuated approximately directly with the proportion of electrolyte, by volume, in the electrolyte-entrained chlorine mixture. However, pumps of other characteristics may also be utilized, including constant power pumps or those of varying speed and power characteristics, providing that such characteristics are known. In such cases, deflecting mass flow rate sensors may be employed or other means for detecting the proportion of gas passing sensor 21 which are in effect, mass flow rate sensor, may be used. Sensor 21 may be replaced by an equivalent device which measures the speed of the pump when constant power pumps are used or which measures the power consumed when constant speed pumps are employed. For pumps of intermediate characteristics, either or both of such measurements may be useful in establishing the mass flow rate. However, in all such cases an important aspect of this invention is in the proportion of entrained chlorine in the electrolyte being determined by a measurement which depends on or also gives the mass flow rate, the magnitude thereof or the relationship thereof to a desired mass flow rate, and from such measurement the addition of chlorine to the system is controlled. Of course, in response to the mass flow rate measurement valve 27 can be adjusted by an operator but it is very highly preferable that such adjustment should be made by inanimate means and preferably it is made automatically.

The sensor 21 is very preferably located downstream of the pump which in turn is located downstream of the chlorine addition line, but such positions can be altered, with both the sensor and the pump being moved upstream of the chlorine addition line when the battery system is operated with an excess of entrained chlorine. However, although it is desirable for some entrained chlorine to enter the electrode compartment to supply additional chlorine to replace that which is dissolved during passage of the electrolyte through th electrode compartment as other dissolved chlorine is consumed, sometimes the exiting electrolyte may contain only dissolved chlorine and this will be at a concentration below saturation. Thus, the preferred location of the pump and sensor is applicable for various types of operations of the battery system and with the sensor downstream of the pump, faster control of the chlorine content of the system is obtained. The present prefereed system is usable even when it is desired that only enough chlorine be employed to completely dissolve as it enters the electrode compartment during normal operation of the battery system. In such cases, the excess chlorine needed at the sensor to provide for complete solution thereof after passing through the dissolver will be approximately constant and the sensor and/or sensor-activated chlorine addition valve 27 can be set so as to regulate the chlorine content at the sensor and provide complete solution thereof by the time that the electrolyte enters the electrode compartment.

Figure 2:
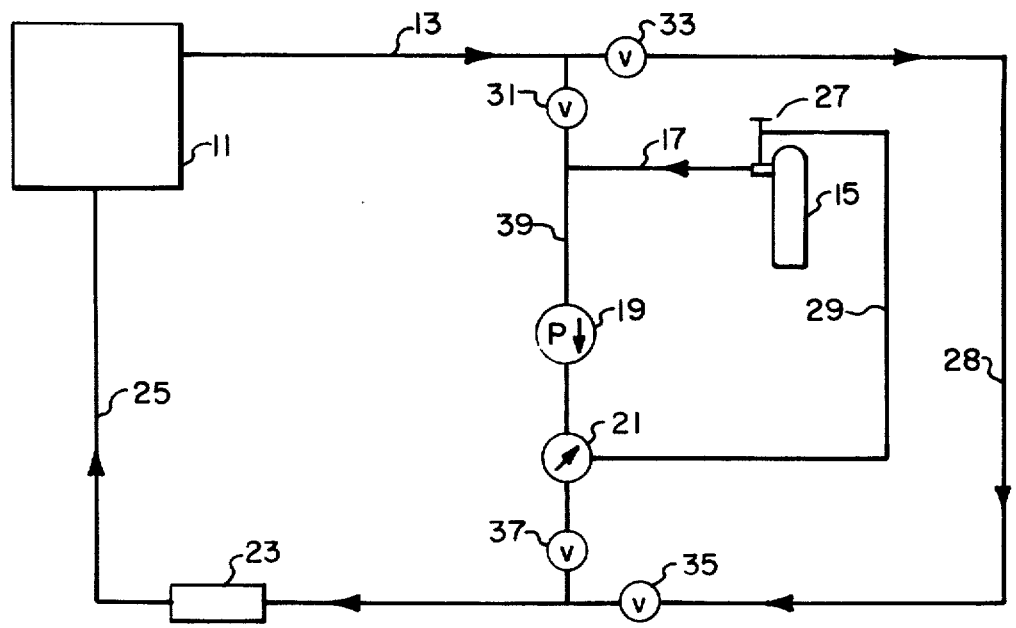
FIG. 2 is a schematic plan view similar to that of FIG. 1 but illustrating the addition of chlorine to only a portion of the recirculating electrolyte, while other such electrolyte bypasses the conduit in which chlorine addition is effected, with the by-passed electrolyte merging with the recharged electrolyte before re-entry to the electrode compartment.

In FIG. 2, a modification of the device of FIG. 1, is illustrated wherein a by-pass conduit or line 28 is provided, together with valves 31, 33, 35 and 37, to control the proportion of electrolyte being fed through the chlorine rejuvenation line, identified as conduit 39. In such cases, better control is obtained because the sensor can be responsive to greater mass flow rate changes, with the rejuvenated electrolyte being blended back in with depleted electrolyte to produce the desired chlorine concentration. Valves 31, 33, 35 and 37 are manually or automatically controllable to adjust the proportions of electrolyte passing through lines 28 and 39. The various other elements of the system are indicated with the same numbers and the descriptions thereof are essentially the same as those of the corresponding parts of FIG. 1.

Figure 3:
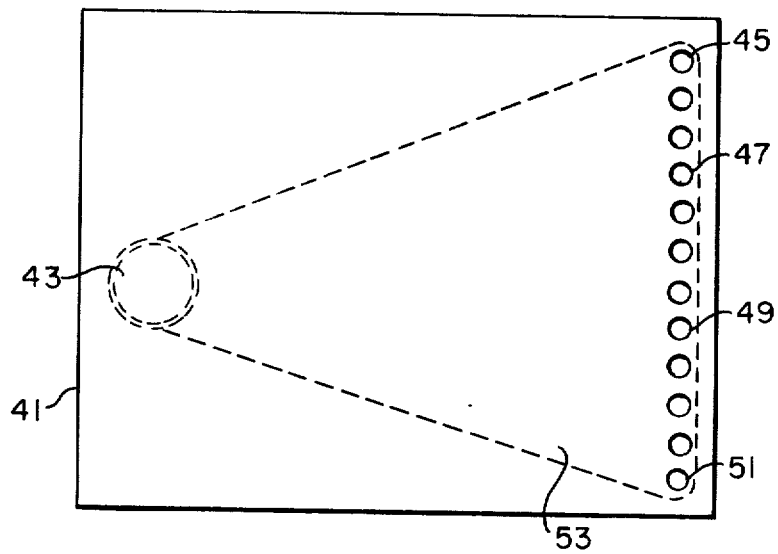
FIG. 3 is a top plan view of a distributor, for use in conjunction with the present invention to assure that the chlorine enriched electrolyte is evenly distributed to various cells of the electrode compartment.
Figure 4:
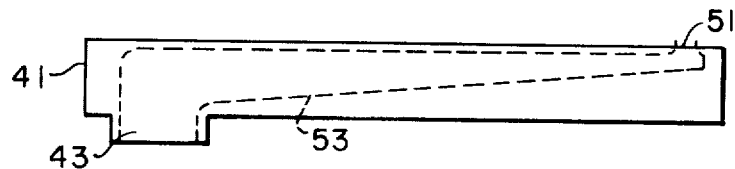
FIG. 4 is a side elevation of such distributor.

FIG. 3 shows a form of distributor for the recharged electrolyte to assure that the various cells of the electrode compartment receive equal proportions of electrolyte. Without an effective distributor or manifold the advantages of rejuvenation of the electrolyte effected by the main invention described herein could be negated by having insufficient electrolyte passing to certain cells so that the chlorine content thereof is depleted and the cell does not contribute effectively to the generation of electricity in the electrode compartment. Thus, it is desirable to have associated with the apparatus of the present invention a distributor such as that of FIG. 3. Distributor 41 may be located shortly before the electrode compartment, but preferably is part thereof, positioned near the bottom. Inlet 43 is comparatively large and outlets 45, 47, 49 and 51, each of which communicates with a separate cell or groups of cells within the electrode compartment, are comparatively small, all being of the same or of approximately the same size, with the total cross-sectional area being from 30 to 200% of that of the inlet. A tapered passageway 53 communicates the inlet with the outlets and causes the pressure at each of the outlets to be the same. Because the cells will have approximately the same internal resistances to fluid flow the rates of flow of electrolyte through them will be equal. Use of the described distributor also helps to maintain uniform the composition of the electrolyte entering each of the cells. Any changes due to heat, impurities or other different conditions to which the electrolyte entering the cells might be otherwise subjected, if separate passageways were employed for each, are obviated by utilizing a manifold of the present structure when the various cell feeds are in communication until they enter the respective cells.

In operation the present system is foolproof, requires little or no maintenance or outside control and is very economical.. The pump 19 may be kept in continuous operation, whether or not the battery system is being charged or discharged, or it may be shut down during idle periods. If operation is to be intermittent it may be desirable to provide means, not illustrated, for closing off any venting openings, also not illustrated, so as to prevent any unnecessary los of chlorine from the system during no discharge periods. During periods in which the battery system is being charged, so that chlorine is being generated, the sensor and the chlorine addition valve may be inactivated by means, not shown, which means may be a simple electrical switch to inactivate valve 27 and maintain it in closed position. Of course, during charging, takeoff means, not illustrated, will be provided for withdrawing generated chlorine, which will be compressed or converted to chlorine hydrate, for subsequent use during discharge.

The materials of construction employed are those which can withstand aqueous metal chloride, such as zinc chloride, containing wet chlorine. Although irons and steels are useful, it is preferred that valve parts be titanium, titanium alloy, polytetrafluoroethylene or other similar resistant metal, metal alloy or plastic. Aqueous zinc chloride is the electrolyte normally employed. Other metal electrodes than zinc can be utilized, such as those of iron, nickel, chromium and alloys thereof and other inert electrodes can take the place of the graphite or carbon.

The temperature of the electrolyte will usually be in the range of 5° to 50°C. and the temperature of a hydrate store, if utilized, will normally be held below 5°C. and can be as low as −20°C. Preferably, the hydrate is at −5° to +5°C. and pressurized chlorine, if employed, is at room temperature or whatever lower temperature it drops to due to loss of heat during expansion to atmospheric pressure. The pressure in the present system will preferably be positive, usually being from one inch of water to one atmosphere and more preferably being from 0.5 to 5 lbs./sq. in., although much higher pressure can be also be developed by the preferred positive displacement pumps. The proportion of circulating electrolyte, on a liquid or mass basis, passing through the rejuvenating line will normally be from 10 to 100 percent, preferably from 30 to 100 percent, when the battery system is discharging continuously. Absolute flow rates for the electrolyte and the chlorine are variable depending on the size of the battery, but normal flow rates, based on electrolyte circulation through the electrode compartment, are from 100 cubic centimeters per minute to 10 liters per minute, and electrolyte concentrations are normally from 10 to 40% by weight or to saturation of the metal halide in water.

The invention has been described with respect to preferred embodiments, but is not to be limited only to those because it is evident that equivalents and substitutes may be employed without departing from the spirit and scope of the invention.

What is claimed is:

1. An improved method for controlling the addition of chlorine to an electric energy storage device of the metalchlorine type, having an electrode compartment with an inlet means and an outlet means wherein chlorine laden aqueous metal halide electrolyte is passed into the electrode compartment inlet and electrolyte having lower chlorine content than that passing into said inlet is passed out of the electrode compartment outlet while a pumping means circulates the electrolyte from said outlet to said inlet through a means for sensing the chlorine to aqueous electrolyte ratio, then comparing said ratio to a desired ratio of chlorine to aqueous electrolyte wherein the improvement comprises sensing the chlorine to aqueous electrolyte ratio by measuring the mass flow rate of said circulating electrolyte and controlling the addition of chlorine to said circulating electrolyte in response to the sensed mass flow rate.

2. A method according to claim 1, wherein the mass flow rate is measured at a point between the pump and the electrode compartment inlet and the pump is located between the site of chlorine addition and the electrode compartment inlet, the addition of chlorine to the circulating electrolyte in response to the sensed mass flow rate being such that when the mass flow rate diminishes below a perdetermined level at which the chlorine : aqueous metal halide electrolyte ratio is that desired, addition of chlorine gas to the electrolyte is diminished or halted and when the mass flow rate increases above such level, chlorine addition is resumed or increased.

3. A method according to claim 1, wherein a device for sensing the mass flow rate of material being pumped is at the position between the situs of the pump and the electrode compartment inlet and it automatically controls the addition of chlorine to the circulating electrolyte.

4. A method according to claim 1, which comprises pumping this electrolyte-chlorine mixture with a pump of fixed pumping power located between the situs of the chlorine addition and the electrode compartment inlet sensing the mass flow rate of material being pumped at a position between the situs of the pump and the electrode compartment inlet and controlling the addition of chlorine to the circulating electrolyte in response to the sensed mass flow rate so that when the mass flow rate diminishes below a predetermined level at which the chlorine : aqueous metal halide electrolyte ratio is that desired, addition of chlorine to the electrolyte is diminished or halted and when the mass flow rate increases above such level addition of chlorine is resumed or increased.

5. A method according to claim 1, which comprises pumping the electrolyte-chlorine mixture at a point between the situs of the chlorine addition and the electrode compartment inlet, sensing the mass flow rate of material being pumped by measuring the power being consumed by the pump when utilizing a constant speed pump.

6. An improved electric storage device of the metal chlorine type having an electrode compartment with an inlet means and an outlet means for passage of an aqueous metal halide electrolyte into said compartment and out of said compartment with means for circulating said electrolyte from said outlet means through a first conduit and back to said inlet means, wherein the improvement comprises:

1. sensing means to measure the chlorine to electrolyte ratio in said conduit, by measuring the mass flow rate of the material being circulated; and
2. means to compare the mass flow rate with a desired ratio of chlorine to electrolyte while controlling the addition of chlorine to the circulating electrolyte in response to the sensed mass flow rate.

7. The device of claim 6, further comprising pumping means located in said first conduit and positioned between the situs of chlorine addition and the electrode compartment inlet means.

8. The device of claim 7, wherein the sensing means is positioned between the pumping means and the electrode compartment inlet means.

9. The device of claim 8, wherein the sensing means to control the addition of chlorine to the circulating electrolyte automatically so that when the mass flow rate diminishes below a predetermined level at which the chlorine : aqueous metal chloride electrolyte ratio is that desired, addition of chlorine to the electrolyte is diminished or halted and when the mass flow rate increases above such level addition of chlorine gas is resumed or increased.

10. The device of claim 6, wherein the sensing means is capable of sensing the mass flow rate of material being pumped by measuring the power being consumed by the pump when the pump is a constant speed pump.

11. The device of claim 6, wherein the sensor includes means to control automatically the addition of chlorine to the circulating electrolyte so that when the mass flow rate diminishes below a predetermined level at which the chlorine : aqueous metal chloride electrolyte ratio is that desired addition of chlorine gas to the electrolyte is diminished or halted and when the mass flow rate increases above such level addition of chlorine is resumed or increased.

* * * * *